United States Patent
Takeuchi et al.

(10) Patent No.: US 12,031,331 B2
(45) Date of Patent: Jul. 9, 2024

(54) REINFORCED CONCRETE STRUCTURE

(71) Applicant: Nippon Telegraph and Telephone Corporation, Tokyo (JP)

(72) Inventors: Yosuke Takeuchi, Musashino (JP); Ryuta Ishii, Musashino (JP); Takuya Kamisho, Musashino (JP); Masayuki Tsuda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 393 days.

(21) Appl. No.: 17/431,953

(22) PCT Filed: Feb. 14, 2020

(86) PCT No.: PCT/JP2020/005759
§ 371 (c)(1),
(2) Date: Aug. 18, 2021

(87) PCT Pub. No.: WO2020/175183
PCT Pub. Date: Sep. 3, 2020

(65) Prior Publication Data
US 2021/0381238 A1   Dec. 9, 2021

(30) Foreign Application Priority Data
Feb. 28, 2019   (JP) ................... 2019-036067

(51) Int. Cl.
*E04C 5/00* (2006.01)
*C04B 14/48* (2006.01)
(Continued)

(52) U.S. Cl.
CPC .............. *E04C 5/015* (2013.01); *C04B 14/48* (2013.01); *C04B 22/064* (2013.01); *E04C 3/34* (2013.01);
(Continued)

(58) Field of Classification Search
CPC .......... E04C 5/01; E04C 5/0515; E04C 5/017; E04C 3/34; E04C 3/44; C04B 14/00;
(Continued)

(56) References Cited

U.S. PATENT DOCUMENTS 6,145,262 A * 11/2000 Schrader ................. E01C 11/14
52/700
6,832,454 B1 * 12/2004 Iyer .......................... E04G 5/08
52/223.4
(Continued)

FOREIGN PATENT DOCUMENTS

JP      H08-319589 A    12/1996
JP      2007-2585 A     1/2007

OTHER PUBLICATIONS

Nobuyoshi Hara, *Fundamentals of Corrosion of Metals*, Journal of the Vacuum Society of Japan, vol. 44, No. 10, 2001, pp. 860-867.
(Continued)

*Primary Examiner* — Chi Q Nguyen
(74) *Attorney, Agent, or Firm* — Workman Nydegger

(57) ABSTRACT

Reinforced concrete is protected from corrosion without conducting an operation involving exposure of rebar. A reinforced concrete structure is provided with a storage part that is formed inside concrete of the reinforced concrete structure, and that retains an anticorrosion solution. The anticorrosion solution diffuses and permeates through the concrete from the storage part, prevents the concrete in the vicinity of rebar from drying, and passivates the rebar.

18 Claims, 5 Drawing Sheets

(51) Int. Cl.
*C04B 22/06* (2006.01)
*E04C 3/34* (2006.01)
*E04C 5/01* (2006.01)
*C04B 103/61* (2006.01)
*C04B 111/26* (2006.01)

(52) U.S. Cl.
CPC ....... *C04B 2103/61* (2013.01); *C04B 2111/26* (2013.01)

(58) Field of Classification Search
CPC ....... C04B 14/48; C04B 22/06; C04B 22/064; C04B 22/066; C04B 22/068; C04B 2103/61; C04B 2103/60; C04B 2103/606; C04B 2111/26; C04B 2111/265
See application file for complete search history.

(56) References Cited

U.S. PATENT DOCUMENTS

| | | | | |
|---|---|---|---|---|
| 7,314,333 | B2* | 1/2008 | Shaw | E01C 11/14 |
| | | | | 404/66 |
| 10,253,500 | B2* | 4/2019 | Edoo | E04C 5/07 |
| 10,858,825 | B2* | 12/2020 | Shaw | E04B 1/48 |
| 11,623,380 | B2* | 4/2023 | Shaw | E01C 23/045 |
| | | | | 29/527.1 |
| 2015/0113913 | A1* | 4/2015 | Kim | E04C 5/208 |
| | | | | 52/834 |
| 2017/0113169 | A1* | 4/2017 | Russell | B28B 11/247 |
| 2021/0292978 | A1* | 9/2021 | Shaw | E01C 11/14 |
| 2022/0042311 | A1* | 2/2022 | Saadatmanesh | E04C 5/168 |
| 2022/0298792 | A1* | 9/2022 | Low | E04C 5/0618 |
| 2023/0133285 | A1* | 5/2023 | Russell | C04B 38/0605 |
| | | | | 106/643 |
| 2023/0139550 | A1* | 5/2023 | Russell | C04B 7/22 |
| | | | | 106/705 |

OTHER PUBLICATIONS

Hirozo Mihashi et al., *Influence of Local Climate Condition on Carbonation Rate in Concrete*, Concrete Research and Technology, vol. 10, No. 1, 1999, pp. 143-149.

Takao Handa et al., *Hydrogen Delayed Fracture of Steel in Concrete*, IEICE Technical Report, vol. 109, No. 346, 2009, pp. 7-10.

Takao Ueda et al., *Deterioration of Concrete Structures and Some Relevant Issues*, Material and Environment, vol. 59, 2010, pp. 111-116.

*Standard Test Method for Corrosion Potentials of Uncoated Reinforcing Steel in Concrete*, Designation: C876-15, vol. 03.02, Annual book of ASTM Standards, ASTM International, vol. 03.02, 2018, pp. 1-8.

* cited by examiner

REINFORCED CONCRETE STRUCTURE

TECHNICAL FIELD

The present invention relates to a reinforced concrete structure.

BACKGROUND ART

Although corrosion of metal is caused in humid environments, it is considered that iron in an alkaline environment is passivated and prevented from corrosion (NPL 1). Reinforced concrete, which includes concrete or cement that is alkaline, protects iron from corrosion. As long as the concrete is sound, the soundness of rebar therein is also maintained.

The concrete outdoors exhibits a depth (progress) of neutralization in units of several millimeters per year. An adequate concrete cover depth would thus protect the rebar from corrosion (NPL 2). In a case where the concrete has been neutralized, however, it is likely that the rebar is corroded. In particular, in a case where a crack has occurred in the concrete, local neutralization of the concrete develops in the vicinity of a site where the crack has occurred, and thus the rebar in the site where the crack has occurred is corroded (NPL 3).

A reinforced concrete structure would be renewed in a case where the crack is large, and would be repaired in a case where the crack is minute. As a method for repairing neutralized concrete, re-alkalinization by an electrochemical process is found (NPL 4). The electrochemical process is desalinization for repair by using an electrochemical device to pass a huge current through a deteriorated existing concrete structure in a short period of time.

CITATION LIST

Non Patent Literature

[NPL 1] Hara, "Fundamentals of Corrosion of Metals", J. Vac. soc., vol. 44_860
[NPL 2] Mihashi, "Influence of Local Climate Condition on Carbonation Rate in Concrete", Concrete Research and Technology, Vol. 10, pp. 143-149 (1999)
[NPL 3] Handa, "Hydrogen delayed fracture of steel in concrete", IEICE Technical Report, R2009-47, pp. 7-10 (2009)
[NPL 4] Ueda, "Deterioration of Concrete Structures and Some Relevant Issues", Zairyo-to-Kankyo, vol. 59, pp. 111-116 (2010)
[NPL 5] Standard Test Method for Corrosion Potentials of Uncoated Reinforcing Steel in Concrete", ASTM C 876-15, Annual book of ASTM Standards, vol. 03.02, pp. 457-462 (1999)

SUMMARY OF THE INVENTION

Technical Problem

The rebar needs electrical connection to subject the reinforced concrete where a minute crack has occurred to re-alkalinization by the electrochemical process. This requires an operation involving destruction, including chipping a part of the concrete to expose the rebar and the like.

The present invention is made with the problem in view, and an object of the present invention is to protect reinforced concrete from corrosion without conducting an operation involving exposure of rebar.

Means for Solving the Problem

To achieve the object, one aspect of the present invention is a reinforced concrete structure provided with a storage part that is formed inside concrete of the reinforced concrete structure, and that retains an anticorrosion solution. The anticorrosion solution diffuses and permeates through the concrete from the storage part, prevents the concrete in the vicinity of rebar from drying, and passivates the rebar.

Effects of the Invention

According to the present invention, the reinforced concrete is protected from corrosion without conducting an operation involving exposure of the rebar.

DESCRIPTION OF EMBODIMENTS

Figure 1:
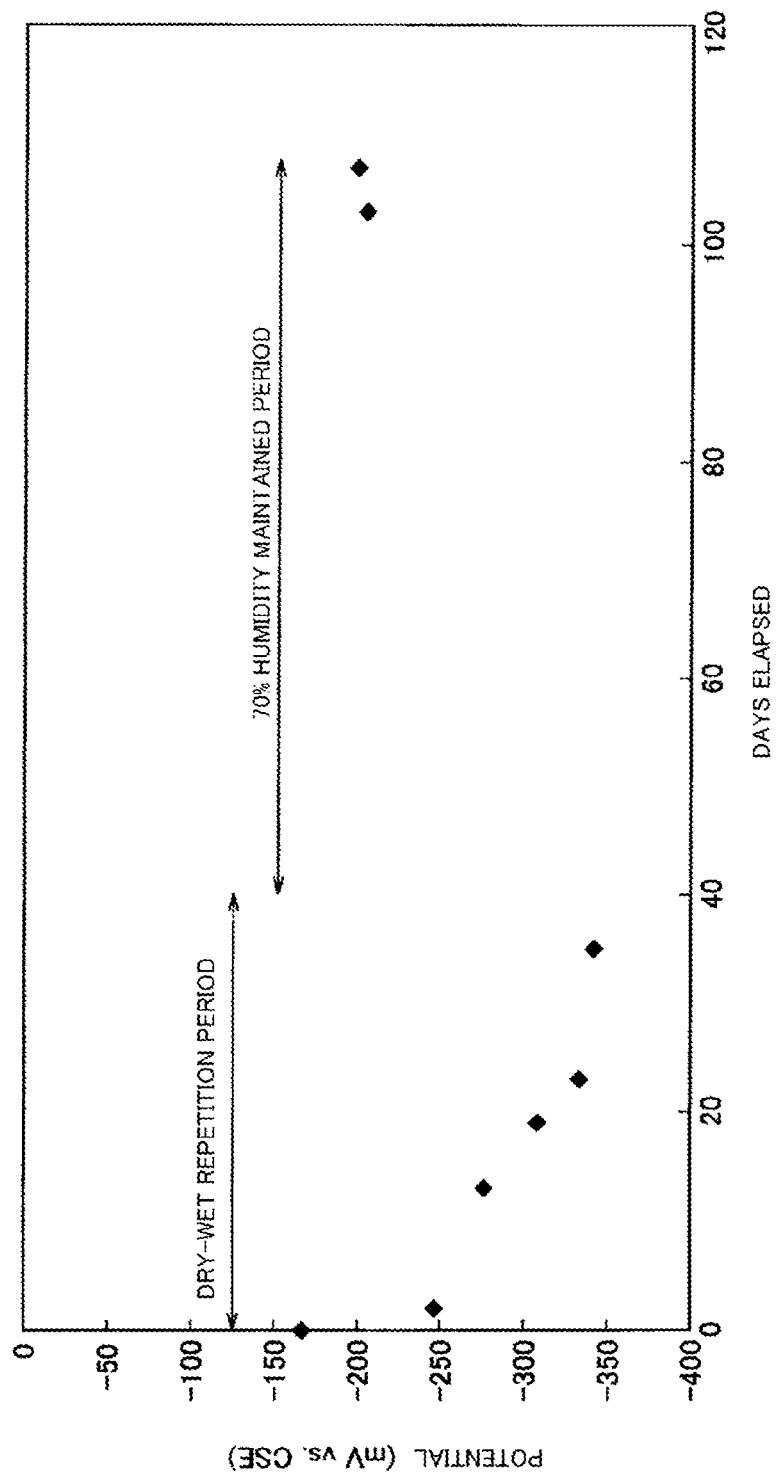
FIG. 1 illustrates results of measurement of a potential of a reinforced concrete test block.

The following explains an embodiment of the present invention, referring to the drawings.

Reinforced concrete protects rebar inside from corrosion with the rebar playing the role of enhancing the strength of concrete, and with the alkaline concrete covering the rebar. The rebar in sound reinforced concrete with no cracks is covered by the alkaline environment of the concrete, and thus is passivated. In reinforced concrete where a crack has occurred, however, neutralization is developed inside the concrete in the part of the crack, thus causing depassivation to develop corrosion of the rebar.

Once a crack occurs in the concrete, the inside of the crack is neutralized, and then, when neutral to acidic moisture enters into this site, the rebar is corroded. However, even in a case where the inside of the crack is neutralized, corrosion protection is made possible by causing an alkaline solution to stay retained in the vicinity of the rebar.

In addition, since the concrete exhibits a depth (progress) of neutralization in units of several millimeters per year, most of the concrete remains as an un-neutralized region. Thus, even in a case where neutral to acidic moisture such as rain water has entered into the crack, and in a case where the moisture stays retained, calcium hydroxide of the concrete in the un-neutralized region is dissolved into the retained moisture, and diffuses via the concrete, so that the vicinity of the rebar is changed into an alkaline environment.

Accordingly, if it is made possible to supply and maintain alkaline to neutral moisture to the reinforced concrete, cause the alkaline moisture to be retained in the vicinity of the rebar, and prevent the entry of neutral to acidic moisture, the rebar is protected from corrosion.

FIG. 1 illustrates results of measurement of a potential of a reinforced concrete test block. FIG. 1 indicates results of measurement of the potential observed when the reinforced concrete test block that has a crack having a width of 0.1 mm has been subjected to a dry-wet repetition test including repeating, as one cycle, a wet process of soaking the test block in water for seven hours, and a dry process of putting the test block in a thermostatic chamber (maintained at 60° C.) for 41 hours, and then has been left in the environment of a humidity of approximately 70%. In FIG. 1, a base potential is exhibited during the period (days 0-40) in which the test block has continuously been subjected to the dry-wet repetition test, and a noble potential is exhibited during the period (days 100-) in which the test block is left in the environment of a humidity of approximately 70%. Meanwhile, although measurement data is not indicated in the period of days 40-100, it can be considered that the potential moderately rises from −350 mV to −200 mV.

According to NPL 5 in APPENDIX X1.1.3, in a case where the potential in a specific region is more minus than −350 mV vs. CSE, it is determined that the rebar in the specific region is corroded at a probability of 90% or more. In view of this, it can be considered that the corrosion is developed by dry-wet repetition. Meanwhile, the noble potential indicates a cessation of the corrosion. It can be considered that this results from leaving the test block in the environment of a humidity of 70% to cause moisture to stay retained inside the crack. This indicates that the retention of moisture exhibits the effect of corrosion protection.

First Embodiment

Figure 2:
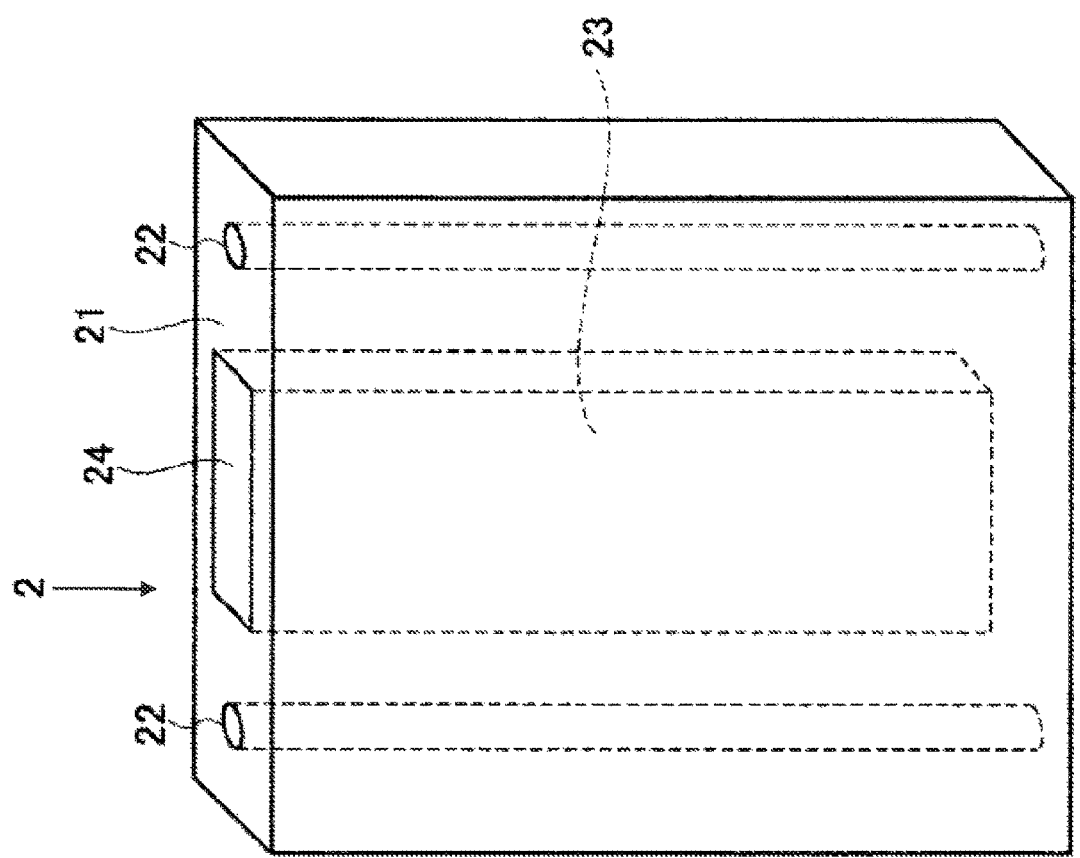
FIG. 2 illustrates the configuration of a reinforced concrete structure according to an embodiment of the present invention.

FIG. 2 illustrates the configuration of a reinforced concrete structure (reinforced concrete) according to a first embodiment.

A reinforced concrete structure 2, illustrated, has multiple pieces of rebar 22 disposed inside concrete 21. The reinforced concrete structure 2 has a solution storage part 23 for retaining (storing) an anticorrosion solution 4 formed inside the concrete 21. The solution storage part 23 is a space (hollow) surrounded by the concrete 21 and is a region where the anticorrosion solution is stored. The solution storage part 23 shall beforehand be formed as the product shape in the reinforced concrete structure 2. The reinforced concrete structure 2 includes a lid 24 disposed on the top of the solution storage part 23. The lid 24 is openable, and the anticorrosion solution 4 is supplied to the solution storage part 23 via the lid 24.

In the present embodiment, the anticorrosion solution 4 is retained in the solution storage part 23, thus allowing the concrete 21 in the vicinity of the rebar 22 to constantly hold moisture of the anticorrosion solution 4. In the present embodiment, this suppresses corrosion of the rebar 22 inside the reinforced concrete structure 2.

Specifically, the anticorrosion solution 4 retained in the solution storage part 23 surrounded by the concrete 21 permeates the inside of the concrete 21 by permeation and diffusion. As a result, a corrosion protection environment is maintained in the vicinity of the rebar 22 by the diffusion of the anticorrosion solution 4 via the concrete 21 even in a case where a crack that reaches the rebar 22 has occurred.

Figure 3:
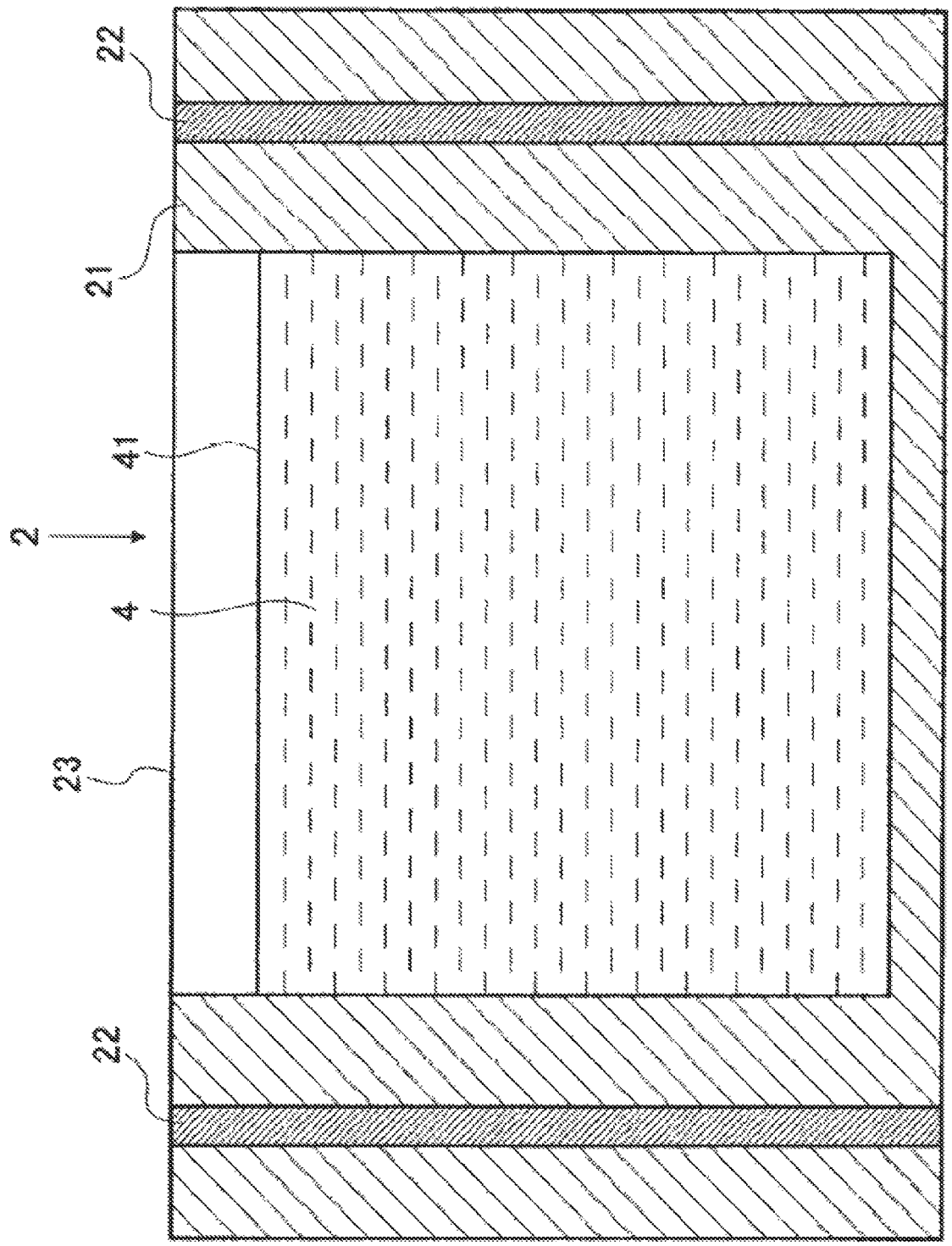
FIG. 3 is a cross-sectional view of the reinforced concrete structure.

FIG. 3 is a cross-sectional view of the reinforced concrete structure 2 illustrated in FIG. 2. In FIG. 3, the anticorrosion solution 4 is stored in the solution storage part 23.

The anticorrosion solution 4 permeates and diffuses through the concrete 21 from the solution storage part 23, prevents the concrete 21 in the vicinity of the rebar 22 from drying to alkalinize the concrete 21, and passivates the rebar 22. The anticorrosion solution 4 has a pH value in a range of pH 7 to pH 12. That is to say, the anticorrosion solution 4 is an alkaline solution.

The anticorrosion solution 4 may contain, for example, at least one of sodium hydrogen carbonate, potassium hydroxide, sodium hydroxide, and calcium hydroxide.

Furthermore, the anticorrosion solution 4 is preferably a solution containing any one of sodium hydrogen carbonate, potassium hydroxide, sodium hydroxide, and calcium hydroxide as a main component. This prevents deterioration of the concrete 21 that would be caused in a case where neutral moisture is used as the anticorrosion solution 4, while achieving the corrosion protection of the rebar 22. The wording main component refers to a solution having a concentration of at least 0.1% or more.

In addition, in a case where the anticorrosion solution 4 that contains calcium hydroxide is used, the calcium hydroxide reacts with carbon dioxide in an atmosphere to form a film 41 of calcium carbonate on a surface of the anticorrosion solution 4. This film prevents evaporation of the anticorrosion solution 4.

When the reinforced concrete structure 2 is installed, the anticorrosion solution 4 shall be supplied to the solution storage part 23 to constantly put the solution storage part 23 in a state of retaining (storing) the anticorrosion solution 4. In addition, in a case where the anticorrosion solution 4 in the solution storage part 23 has been decreased or depleted due to evaporation or the like of the anticorrosion solution 4, the anticorrosion solution 4 shall be supplied (refilled) with the anticorrosion solution 4 after the lid 24 is opened.

Second Embodiment

Next, the following explains a second embodiment in which the reinforced concrete structure 2 according to the first embodiment is applied to a concrete pole. The concrete pole is a columnar reinforced concrete structure, such as, for example, a utility pole.

An ordinary, commercially-available concrete pole has a lid attached in a bottom part thereof, and a drain hole formed therein. Moisture that has entered into the concrete pole due to rainfall or the like is discharged underground through the drain hole. Moisture enters into the concrete pole from a hole (not illustrated) or the like formed on a side surface of the concrete pole.

Figure 4:
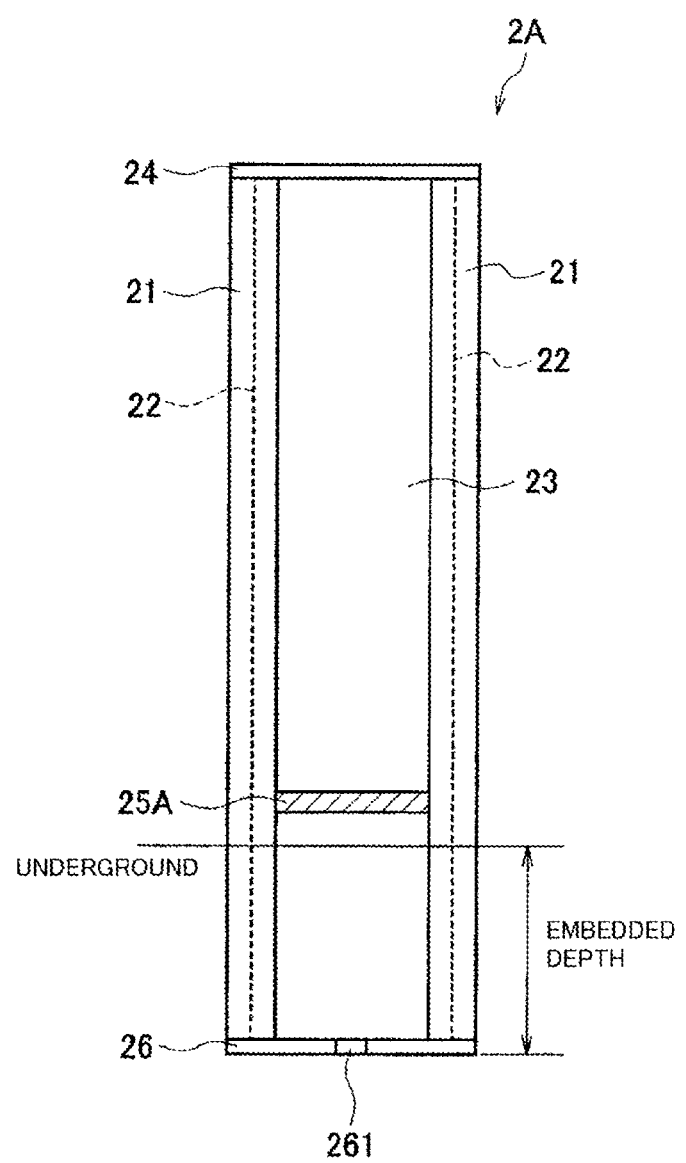
FIG. 4 is a cross-sectional view of a concrete pole.

FIG. 4 is a cross-sectional view of a concrete pole 2A. The concrete pole 2A, illustrated, has multiple pieces of rebar 22 disposed inside concrete 21. The concrete pole 2A has a solution storage part 23 formed, inside the concrete 21, for retaining an anticorrosion solution. The solution storage part 23 is a hollow having a periphery thereof surrounded by the concrete 21 and is a region where the anticorrosion solution is stored. The anticorrosion solution according to the present embodiment is similar to the anticorrosion solution 4 in the first embodiment.

The concrete pole 2A, illustrated, is provided with a partition part 25A (for example, a partition plate or the like) that partitions the hollow inside the concrete pole 2A. In the present embodiment, the partition part 25A is used to form the solution storage part 23 inside the concrete 21. The solution storage part 23 in the present embodiment is easily formed by partitioning, with the partition part 25A, the hollow formed in the concrete pole 2A.

Meanwhile, the occurrence of a crack in the concrete pole 2A is frequently found in a ground surface adjacency portion that comes in contact with the ground surface, a termination point of main reinforcement portion (a portion where the number of pieces of rebar is decreased), a portion where cables are laid, etc. It is thus preferable that the partition part 25A be formed in a position that, when the concrete pole 2A is installed, comes to the vicinity of the portions as mentioned above where a crack is likely to frequently occur. For a crack in the ground surface adjacency portion, for example, it is preferable that the disposition position of the partition part 25A be determined to be in the vicinity of the ground surface adjacency portion, in consideration of the embedded depth at which the concrete pole 2A is embedded into the ground.

Furthermore, the concrete pole 2A may include multiple partition parts 25A. The partition parts 25A are respectively in the portions where a crack is likely to frequently occur so that multiple solution storage parts 23 can be formed inside the concrete pole 2A.

In a case where the partition parts 25A is formed in the vicinity of a ground surface adjacency, the moisture of the anticorrosion solution is held in the concrete 21 in the ground surface adjacency portion of the concrete pole 2A where a crack is likely to frequently occur, and the corrosion protection environment is thus maintained, even if the storage amount of the anticorrosion solution is little. Accordingly forming the partition part 25A in the vicinity of the ground surface adjacency allows for reduction of the storage amount of the anticorrosion solution.

The concrete pole 2A includes a lid 24 that is disposed in a top part thereof and openable. The anticorrosion solution is supplied to the solution storage part 23 via the lid 24 or a hole (not illustrated) formed on a side surface of the concrete pole 2A. In addition, the concrete pole 2A includes a lid 26 disposed in a bottom part (lower part) thereof. The lid 26 includes a drain hole 261 that allows moisture to be discharged underground therethrough.

Meanwhile, the partition part may be formed after the concrete pole has been set up (installed).

Figure 5:
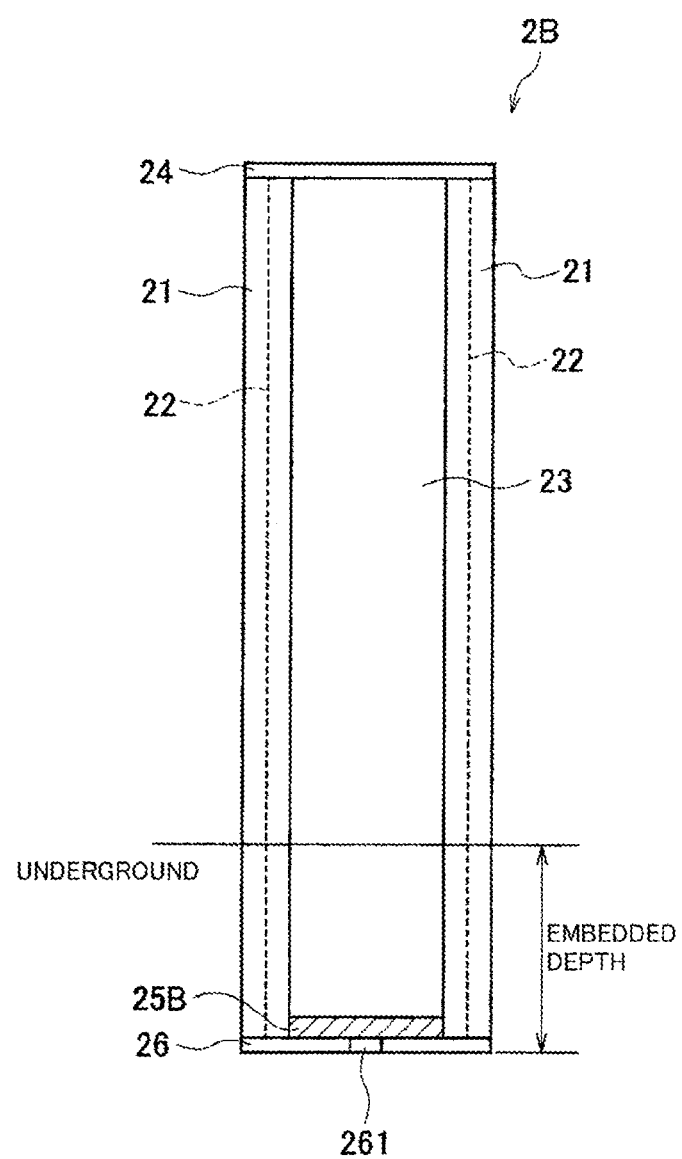
FIG. 5 is a cross-sectional view of a concrete pole in a modified example.

FIG. 5 is a cross-sectional view of a concrete pole 2B that has a partition part 25B formed therein after the pole has been set up (installed). The partition part 25B, illustrated, is formed on a top of the lid 26 in the bottom part so as to close the drain hole 261 of the lid 26. As a result, the entire hollow in the concrete pole 2B thus serve as the solution storage part 23. For example, the lid 24 in the top part is opened, and cement or curable resin is injected into the hollow of the concrete pole 2B, and accumulated on the lid 26 (in particular, the drain hole 261) in the bottom part. The accumulated cement or curable resin is cured, thus forming the partition part 25B.

The reinforced concrete structure as in the present embodiments as explained above is provided with the storage part that is formed inside the concrete of the reinforced concrete, and that retains the anticorrosion solution. The anticorrosion solution diffuses and permeates through the concrete from the storage, prevents the concrete in the vicinity of the rebar from drying, and passivates the rebar. That is to say, in the present embodiments, the anticorrosion solution is retained in the solution storage part so that the concrete in the vicinity of the rebar is caused to constantly hold the moisture of the anticorrosion solution, and corrosion of the rebar in the reinforced concrete structure is suppressed. Accordingly, in the present embodiments, the reinforced concrete structure is easily protected from corrosion at low costs, without conducting an operation involving exposure of the rebar in the reinforced concrete structure where a crack has occurred.

Specifically, the anticorrosion solution permeates the inside of the concrete by permeation and diffusion. As a result, a corrosion protection environment is maintained in the vicinity of the rebar by the diffusion of the anticorrosion solution via the concrete even if a crack that reaches the rebar has occurred. That is to say, moisture is held in the vicinity of the rebar so that acidic to neutral moisture is prevented from entering from the external environment, and an alkaline component is eluted from the un-neutralized region of the concrete, thus protecting the rebar from corrosion.

In addition, the present invention is not limited to the embodiments, and can variously be modified within the spirit thereof.

REFERENCE SIGNS LIST

2 Reinforced concrete structure
2A, 2B Concrete pole
21 Concrete
22 Rebar
23 Solution storage part
24 Lid in the top part
25A, 25B Partition part
26 Lid in the bottom part
261 Drain hole

The invention claimed is:

1. A reinforced concrete structure provided with: a storage part that is formed inside concrete of the reinforced concrete structure, and that retains an anticorrosion solution, wherein the anticorrosion solution diffuses and permeates through the concrete from the storage part, prevents the concrete in a vicinity of rebar from drying, and passivates the rebar.

2. The reinforced concrete structure according to claim 1, wherein the reinforced concrete structure is a concrete pole.

3. The reinforced concrete structure according to claim 2, provided with:
a partition part that partitions a hollow formed inside the concrete pole, wherein the storage part is formed using the partition part.

4. The reinforced concrete structure according to claim 3, wherein the partition part is formed in a position of the concrete pole that comes into contact with a ground surface.

5. The reinforced concrete structure according to claim 4, wherein the anticorrosion solution has a pH value in a range of pH 7 to pH 12.

6. The reinforced concrete structure according to claim 4, wherein the anticorrosion solution contains at least one of sodium hydrogen carbonate, potassium hydroxide, sodium hydroxide, or calcium hydroxide.

7. The reinforced concrete structure according to claim 4, wherein the anticorrosion solution contains calcium hydroxide, and the calcium hydroxide reacts with carbon dioxide in an atmosphere to form a film of calcium carbonate on a surface of the anticorrosion solution.

8. The reinforced concrete structure according to claim 3, wherein the anticorrosion solution has a pH value in a range of pH 7 to pH 12.

9. The reinforced concrete structure according to claim 3, wherein the anticorrosion solution contains at least one of sodium hydrogen carbonate, potassium hydroxide, sodium hydroxide, or calcium hydroxide.

10. The reinforced concrete structure according to claim 3, wherein the anticorrosion solution contains calcium hydroxide, and the calcium hydroxide reacts with carbon dioxide in an atmosphere to form a film of calcium carbonate on a surface of the anticorrosion solution.

11. The reinforced concrete structure according to claim 2, wherein the anticorrosion solution has a pH value in a range of pH 7 to pH 12.

12. The reinforced concrete structure according to claim 2, wherein the anticorrosion solution contains at least one of sodium hydrogen carbonate, potassium hydroxide, sodium hydroxide, or calcium hydroxide.

13. The reinforced concrete structure according to claim 2, wherein the anticorrosion solution contains calcium hydroxide, and the calcium hydroxide reacts with carbon dioxide in an atmosphere to form a film of calcium carbonate on a surface of the anticorrosion solution.

14. The reinforced concrete structure according to claim 1, wherein the anticorrosion solution has a pH value in a range of pH 7 to pH 12.

15. The reinforced concrete structure according to claim 14, wherein the anticorrosion solution contains at least one of sodium hydrogen carbonate, potassium hydroxide, sodium hydroxide, or calcium hydroxide.

16. The reinforced concrete structure according to claim 14, wherein the anticorrosion solution contains calcium hydroxide, and the calcium hydroxide reacts with carbon dioxide in an atmosphere to form a film of calcium carbonate on a surface of the anticorrosion solution.

17. The reinforced concrete structure according to claim 1, wherein the anticorrosion solution contains at least one of sodium hydrogen carbonate, potassium hydroxide, sodium hydroxide, or calcium hydroxide.

18. The reinforced concrete structure according to claim 1, wherein the anticorrosion solution contains calcium hydroxide, and the calcium hydroxide reacts with carbon dioxide in an atmosphere to form a film of calcium carbonate on a surface of the anticorrosion solution.

* * * * *